(12) United States Patent
Zhang

(10) Patent No.: US 11,019,242 B2
(45) Date of Patent: May 25, 2021

(54) CAMERA ASSEMBLY AND ELECTRONIC DEVICE USING THE SAME, BOTH HAVING A DECORATIVE MEMBER MOUNTED ON A SHELL AND COMPRISING A DECORATIVE RING AND A FLANGE

(71) Applicant: GUANGDONG OPPO MOBILE TELECOMMUNICATIONS CORP., LTD., Guangdong (CN)

(72) Inventor: Gong Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 70 days.

(21) Appl. No.: 16/422,994

(22) Filed: May 25, 2019

(65) Prior Publication Data
US 2019/0387144 A1    Dec. 19, 2019

(30) Foreign Application Priority Data

Jun. 14, 2018  (CN) .......................... 201810613614.5
Jun. 14, 2018  (CN) .......................... 201820929310.5

(51) Int. Cl.
*H04N 5/225*    (2006.01)
*G03B 17/17*    (2021.01)
(Continued)

(52) U.S. Cl.
CPC ........... *H04N 5/2257* (2013.01); *G03B 17/17* (2013.01); *H04M 1/0264* (2013.01);
(Continued)

(58) Field of Classification Search
CPC .................................................... G03B 17/17
See application file for complete search history.

(56) References Cited

U.S. PATENT DOCUMENTS 6,850,279 B1 * 2/2005 Scherling ............. H04N 5/2251
                                                   348/335
10,488,631 B2 * 11/2019 Bachar ................. G02B 7/1805
(Continued)

FOREIGN PATENT DOCUMENTS

CN        104980542        10/2015
CN        206039030         3/2017
(Continued)

OTHER PUBLICATIONS

Heater, Brian; "Oppo shows off impressive new zoom technology, but forgot to put it on a real phone" Feb. 27, 2017; techcrunch.com; https://techcrunch.com/2017/02/27/oppo-shows-off-impressive-new-zoom-technology-but-forgets-to-put-it-on-a-real-phone/ (Year: 2017).*
(Continued)

*Primary Examiner* — Gary C Vieaux
(74) *Attorney, Agent, or Firm* — Hodgson Russ LLP

(57) ABSTRACT

The disclosure discloses a camera assembly. The camera assembly includes a shell, a light incident opening defined in the shell, a first imaging module accommodated in the shell, a light-redirecting element, a receiving recess defined in the shell and adjacent to the light incident opening; and a decorative member. The light-redirecting element is accommodated in the shell and configured to redirect an incident light from the light incident opening to the first imaging module. The decorative member is mounted on the shell in such a manner that the light entrance incident opening is exposed from the decorative member and the decorative member is arranged around the light incident opening and partially received in the receiving recess. The disclosure also provides an electronic device.

20 Claims, 8 Drawing Sheets

(51) Int. Cl.
*H04M 1/02* (2006.01)
*H04N 5/232* (2006.01)
(52) U.S. Cl.
CPC ......... *H04N 5/2252* (2013.01); *H04N 5/2253* (2013.01); *H04N 5/2254* (2013.01); *H04N 5/2258* (2013.01); *H04N 5/2328* (2013.01)

(56) References Cited

U.S. PATENT DOCUMENTS

| | | | | |
|---|---|---|---|---|
| 2007/0126911 | A1* | 6/2007 | Nanjo | H04N 5/2254 348/335 |
| 2009/0051804 | A1 | 2/2009 | Nomura et al. | |
| 2016/0291295 | A1* | 10/2016 | Shabtay | G02B 13/04 |
| 2017/0187962 | A1 | 6/2017 | Lee et al. | |
| 2018/0024329 | A1* | 1/2018 | Goldenberg | H04N 5/23258 359/557 |
| 2018/0176426 | A1* | 6/2018 | Wei | A61B 3/154 |
| 2019/0361323 | A1* | 11/2019 | Jerby | G03B 17/17 |

FOREIGN PATENT DOCUMENTS

| | | |
|---|---|---|
| CN | 207124682 | 3/2018 |
| CN | 108521541 | 9/2018 |
| CN | 108535830 | 9/2018 |
| CN | 108540704 | 9/2018 |
| CN | 108769493 | 11/2018 |
| CN | 108769494 | 11/2018 |
| CN | 208386733 | 1/2019 |
| EP | 1780567 | 5/2007 |
| WO | 2011086949 | 7/2011 |
| WO | 2016166730 | 10/2016 |

OTHER PUBLICATIONS

Yedid, Itay; "The Evolution of Zoom Camera Technologies in Smartphones"; Corephotonics White Paper; Aug. 2017 (Year: 2017).*
Anonymous, Moto G (3rd gen) review: Good as gold—GSMArena. com tests, Aug. 6, 2015, <https://www.gsmarena.com/moto_g_3rd_gen-review-1281.php>.
Anonymous, "Moto G (3rd gen) review: Good as gold: Unboxing, design and build quality, controls," Aug. 6, 2015, <https://www.gsmarena.com/moto_g_3rd_gen-review-1281p2.php>.
EPO, Office Action for EP Application No. 19180230.5, dated Nov. 20, 2019.
WIPO, English Translation of the ISR and WO for PCT/CN2019/091020, dated Sep. 11, 2019.
IP India, Examination Report for IN Application No. 201914023557, dated Feb. 17, 2021.

* cited by examiner

CAMERA ASSEMBLY AND ELECTRONIC DEVICE USING THE SAME, BOTH HAVING A DECORATIVE MEMBER MOUNTED ON A SHELL AND COMPRISING A DECORATIVE RING AND A FLANGE

CROSS REFERENCE

This application claims priority to Chinese Patent Application No. 201820929310.5, filed on Jun. 14, 2018, and Chinese Patent Application No. 201810613614.5, filed on Jun. 14, 2018, the entire disclosures of which are incorporated herein by reference.

TECHNICAL FIELD

The disclosure relates to the field of electronic devices. More particularly, and without limitation, the disclosed embodiments relates to a camera assembly and an electronic device using the same.

BACKGROUND

As more and more mobile phones enter people's daily lives, users have put forward higher requirements for the functions of mobile phones. For example, mobile phones are designed to be thinner and lighter, or, mobile phones are designed to have better photographing effects. In order to improve the photographing effect of the mobile phone, the camera of the mobile phone adopts a zoom camera. The zoom camera can, for example, perform a three-fold optical zoom to obtain a better-quality image. Due to the limitation of the thickness of the mobile phone, the zoom camera uses a periscope lens to reduce the height of the zoom lens. However, due to the large width of the periscope lens, the size of the decorative piece matched with the periscope lens is also large, which brings disadvantageous to the compactness of the mobile phone.

SUMMARY

The disclosure relates to a camera assembly and an electronic device using the same.

According to an embodiment of the disclosure, the camera assembly includes a shell, a light incident opening defined in the shell, a first imaging module accommodated in the shell, a light-redirecting element, a receiving recess defined in the shell and adjacent to the light incident opening; and a decorative member. The light-redirecting element is accommodated in the shell and configured to redirect an incident light from the light incident opening to the first imaging module. The decorative member is mounted on the shell in such a manner that the light entrance incident opening is exposed from the decorative member and the decorative member is arranged around the light incident opening and partially received in the receiving recess.

According to another embodiment of the disclosure, A camera assembly includes a shell, a camera module, a light-redirecting element, and a decorative member. The shell defines a light inlet, a receiving recess adjacent to the light inlet, a first cavity communicated with the light inlet opening and a second cavity in communication with the first cavity. The camera module is positioned in the second cavity. The light-redirecting element is positioned in the first cavity. The light-redirecting element is corresponding to the light inlet and configured to redirect an incident light from the light inlet to the camera module. The decorative member is mounted on the shell, the decorative member defines a through hole to expose the light inlet and being partially engaged in the receiving recess.

According to another embodiment of the disclosure, the electronic device includes a casing and a camera assembly accommodated in the casing. The camera assembly includes a shell defining a light incident opening, an image module accommodated inside the shell, a light-redirecting element accommodated inside the shell and configured to redirect an incident light from the light incident opening to the imaging module, a receiving recess defined at the shell and adjacent to the light incident opening, and a decorative member mounted on the shell. The decorative member defines a through hole aligned with the light incident opening to expose the light incident opening. The decorative member is partially received in the receiving recess and partially exposed from the casing.

DETAILED DESCRIPTION OF EMBODIMENTS

Figure 1:
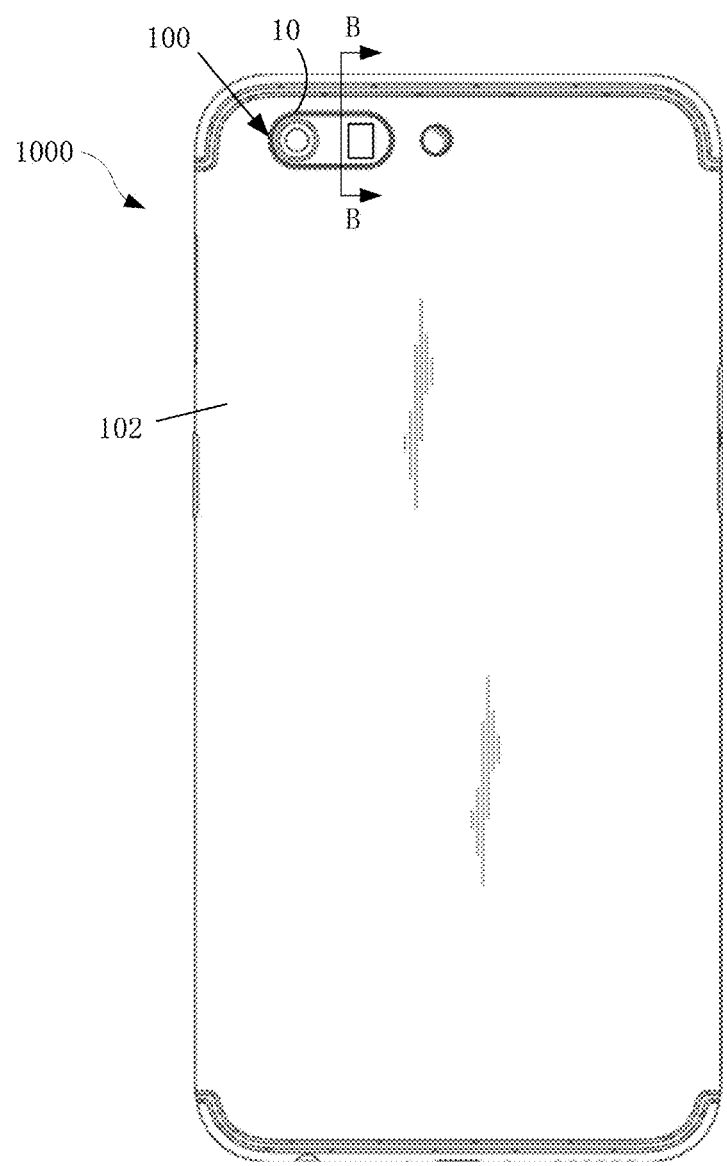
FIG. 1 illustrates a schematic plan view of an electronic device according to an embodiment of the present disclosure.

The embodiments of the present disclosure are described in detail below, and the examples of the embodiments are illustrated in the drawings, wherein the same or similar reference numerals indicate the same or similar elements or elements having the same or similar functions. The embodiments described below with reference to the drawings are intended to be illustrative of the disclosure and are not to be construed as limiting.

FIG. 1 illustrates a schematic plan view of an electronic device 1000 according to an embodiment of the present disclosure. The electronic device 1000 includes a casing 102 and a camera assembly 100. The camera assembly 100 is disposed inside the casing 102. The electronic device 1000 may be a mobile phone, a tablet computer, a notebook computer, a smart bracelet, a smart watch, a smart helmet, smart glasses, and the like. The embodiment of the present disclosure is described by taking the electronic device 1000 as a mobile phone for example. It can be understood that the specific form of the electronic device 1000 may be other devices.

Specifically, the casing 102 is an external component of the electronic device 1000. The function of the casing 102 is protecting internal components of the electronic device 1000. The casing 102 may be a back cover of the electronic device 1000, covering components such as batteries of the electronic device 1000. In the present embodiment, the camera assembly 100 is rearward disposed, or the camera assembly 100 is disposed on the back of the electronic device 1000 so that the electronic device 1000 can perform rear imaging. In FIG. 1, the camera assembly 100 is disposed at a left upper corner portion of the casing 102. Of course, it can be understood that the camera assembly 100 can be disposed at other positions such as the upper middle position or the upper right position of the casing 102. The position of the camera assembly 100 disposed at the casing 102, is not limited to the examples of the present disclosure.

Figure 2:
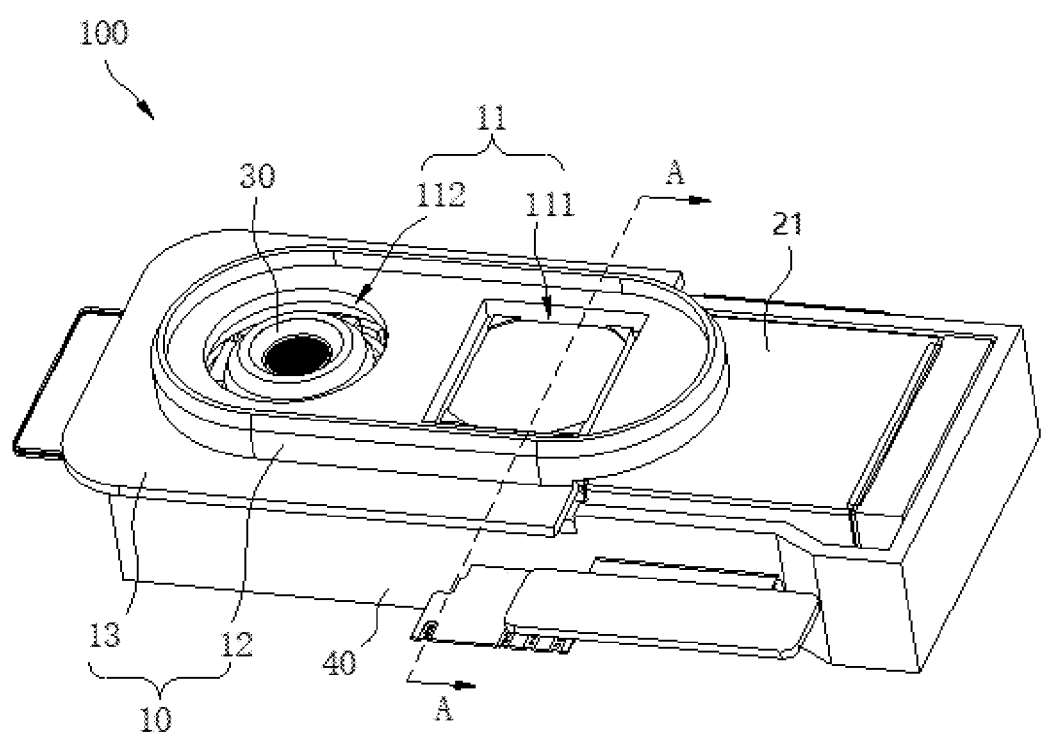
FIG. 2 illustrates a perspective view of a camera assembly according to an embodiment of the present disclosure.
Figure 3:
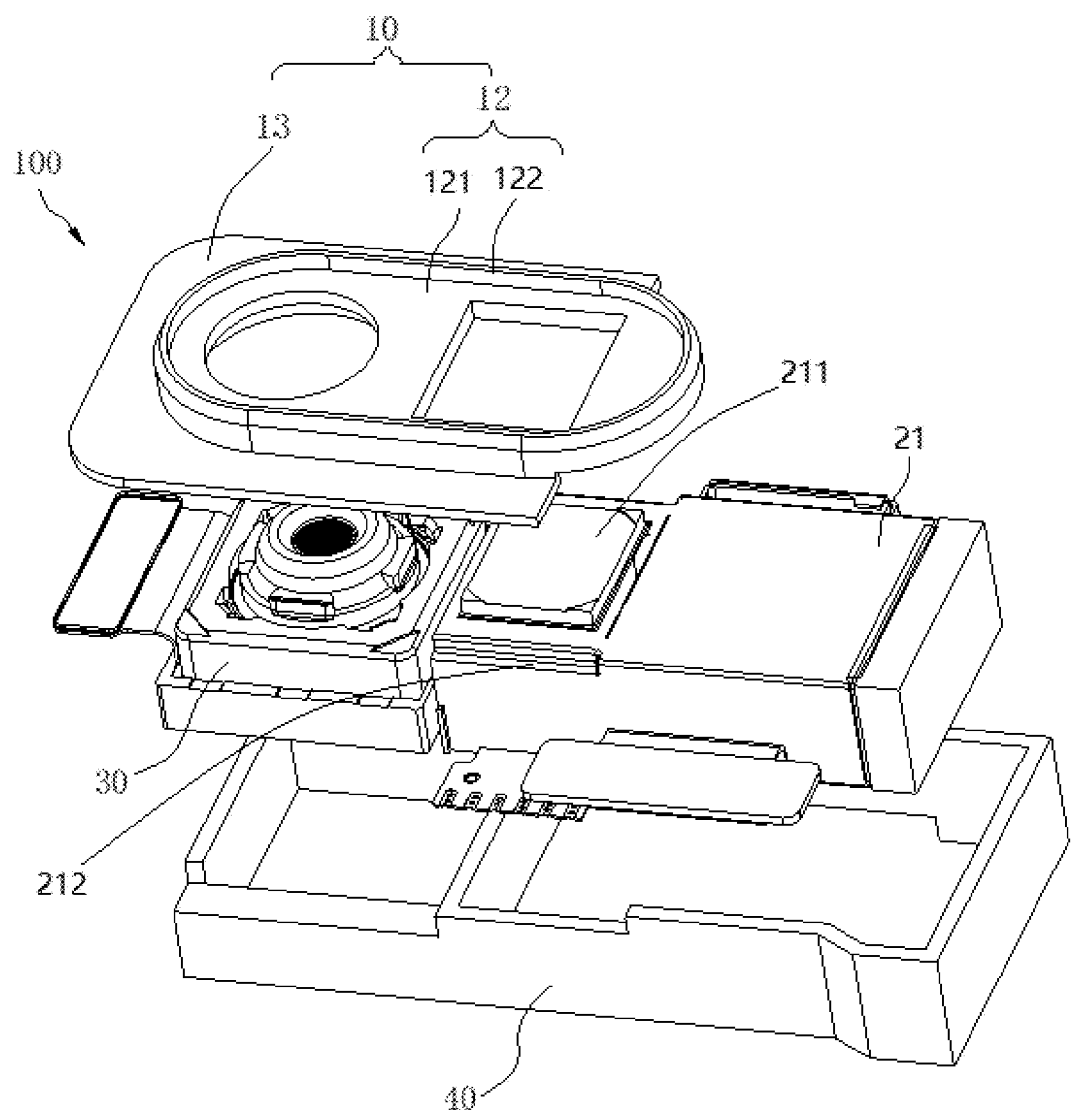
FIG. 3 illustrates an exploded perspective view of a camera assembly according to an embodiment of the present disclosure.

FIGS. 2 and 3 illustrate the camera assembly 100 including a decorative member 10, a first imaging module 20, a second imaging module 30, and a bracket 40. The decorative member 10 is disposed on the casing 102 and protrudes from the surface of the casing 102. The first imaging module 20 and the second imaging module 30 are both disposed inside the casing 102. The first imaging module 20 and the second imaging module 30 are both disposed adjacent to the decorative member 10. The first imaging module 20 and the second imaging module 30 are both disposed in the bracket 40 and fixedly connected to the bracket 40. The decorative member 10 is disposed above the bracket 40. Specifically, the decorative member 10 may abut against the bracket 40 or may be spaced apart from the decorative member 10. The bracket 40 can reduce the impact of the first imaging module 20 and the second imaging module 30 and improve the life of the first imaging module 20 and the second imaging module 30.

The decorative member 10 may be made of a metal material, for example, the decorative member 10 is made of stainless steel, and the decorative member 10 may be processed by a polishing process to form a shiny surface to make the decorative member 10 more aesthetically pleasing.

Figure 4:
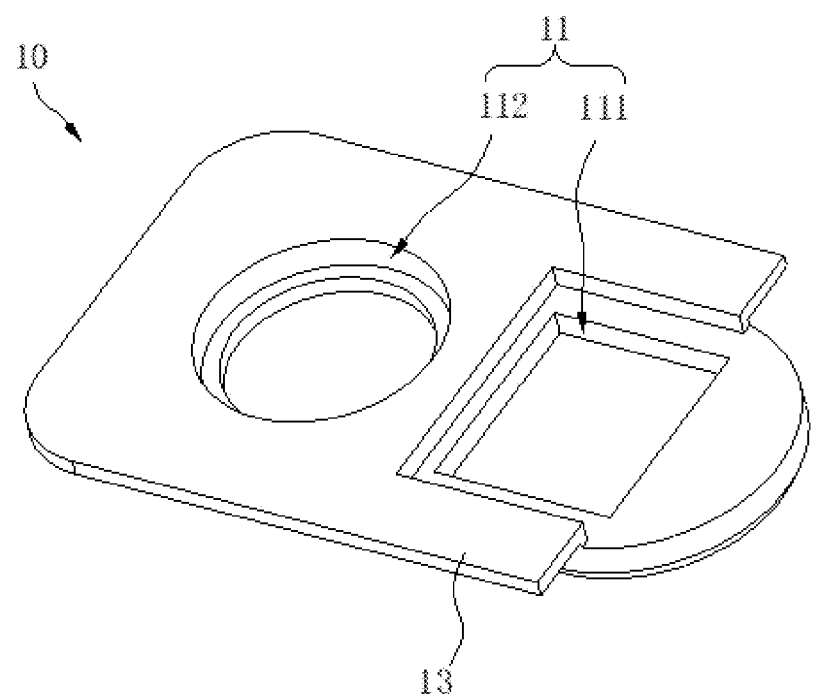
FIG. 4 illustrates a perspective view of a decorative member according to an embodiment of the present disclosure.

Referring to FIG. 4, the decorative member 10 is formed with through holes 11, and the first imaging module 20 and the second imaging module 30 are exposed from the through holes 11 to the decorative member 10, or the first imaging module 20 and the second imaging module 30 capture external images through the through holes 11. Specifically, in the embodiment, the through holes 11 includes a first through hole 111 and a second through hole 112, and the first through hole 111 and the second through hole 112 are adjacent to and spaced apart from each other. In other words, the first through hole 111 and the second through hole 112 are not connected or communicated therewith. Of course, in other embodiments, the first through hole 111 and the second through hole 112 may be in communication with each other to form an integral hole. The first imaging module 20 captures an external image through the first through hole 111, and the second imaging module 30 captures an external image through the second through hole 112. In this embodiment, the first through hole 111 is a circular hole, and the second through hole 112 is a square hole.

In other embodiments, the first through hole 111 and the second through hole 112 are not limited to be the shapes in the drawings. For example, the first through hole 111 and the second through hole 112 are both circular holes; for another example, the first through hole 111 and the second through hole 112 are both square holes.

Figure 10:
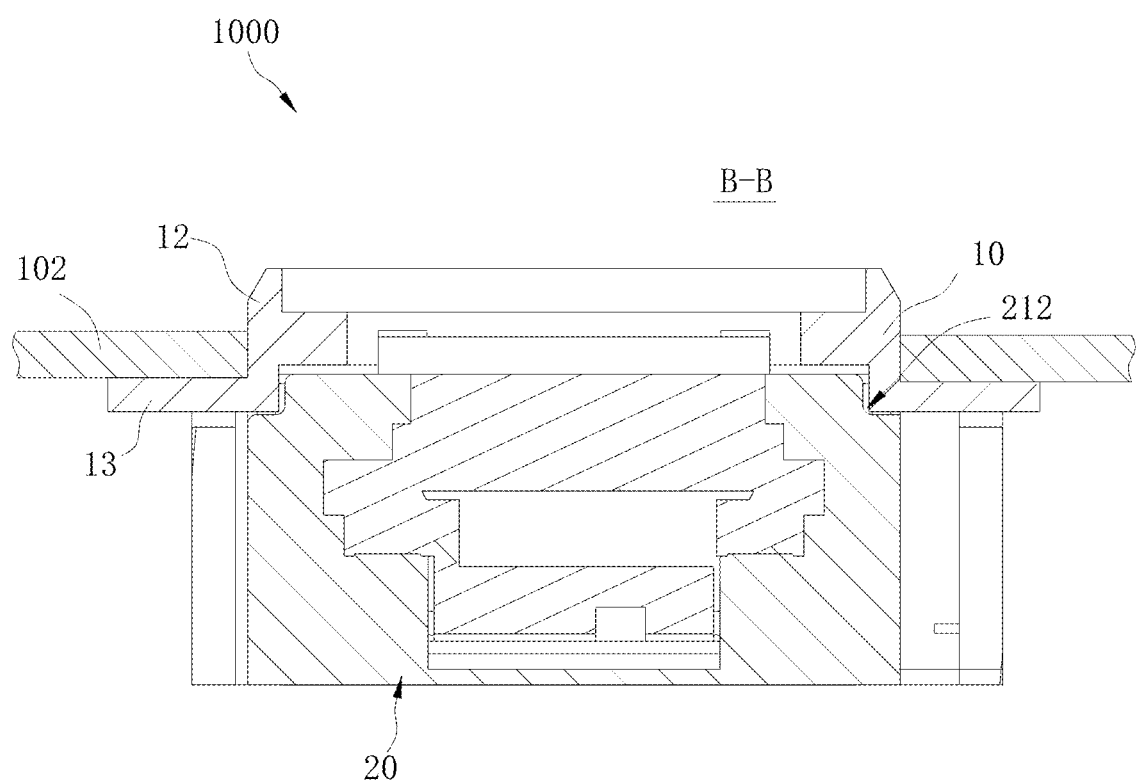
FIG. 10 illustrates a cross-sectional view of the electronic device of FIG. 1 taken along a line B-B.

The decorative member 10 includes a decorative ring 12 and a flange 13, the flange 13 extends from the bottom of the decorative ring 12 and is away from the decorative ring 12. The decorative ring 12 includes an interior part 121 and an annular part 122 surrounding the interior part 121. The through hole 11 is formed in the interior part 121 and penetrates through the interior part 121. The decorative member 12 is mounted on the casing 102, and the decorative ring 12 is exposed outside of the casing 102, and the flange 13 abuts against the casing 102, as shown in FIG. 10. The flange 13 may prevent the decorative member 10 from moving out from the casing 102. In one example, when installing the decorative member 10, the decorative member 10 penetrates outwardly from the interior of the casing 102 until the flange 13 abuts against the inner surface of the casing 102, the decorative member 10 is mounted to a predetermined position. The decorative member 10 may be fixed to the casing 102 by using an adhesive, or the decorative member 10 may be engaged with the casing 102 by an interference-fit, so that the decorative member 10 is not easily detached from the casing 102.

The decorative member 10 may be an integrated molding structure formed by the decorative ring 12 and the flange 13. For example, the decorative member 10 is formed by cutting. In addition, the decorative ring 12 and the flange 13 may also be separated structures, or the decorative ring 12 and the flange 13 may first be formed as two separated components and then assembled together by welding or the like processes to form the decorative member 10.

It should be noted that in other embodiments, the flange 13 may be omitted, that is, in this embodiment, the decorative member 10 just includes the structure of the decorative ring 12.

The first through hole 111 may be aligned with the light incident opening 211 and a second through hole 112 is corresponding to the second imaging module 30. The first imaging module 20 and the second imaging module 30 are arranged side by side, that is, the second imaging module 30 is disposed on one side of the first imaging module 20. In the embodiment, the first imaging module 20 and the second imaging module 30 are arranged in a line shape, or the first imaging module 20 and the second imaging module 30 are arranged along a straight line. In other embodiments, the first imaging module 20 and the second imaging module 30 may be arranged in an "L" shape. The first imaging module 20 and the second imaging module 30 may be spaced apart or may be abutted against with each other.

In the embodiment, the first imaging module 20 is located on the right side of the second imaging module 30, or the first imaging module 20 is closer to the intermediate position of the electronic device 1000 than the second imaging module 30. Of course, it can be understood that, in other embodiments, the positions of the first imaging module 20 and the second imaging module 30 may be exchanged, or the first imaging module 20 may be located on the left side of the second imaging module 30.

In the first imaging module 20 and the second imaging module 30, one of the imaging modules may be a black and white camera, and the other imaging module is an RGB camera; or one imaging module is an infrared camera, and another imaging module is RGB camera; or one imaging module is RGB camera, the other imaging module is also RGB camera; or one imaging module is wide-angle camera, and the other imaging module is telephoto camera.

In other embodiments, the second imaging module 30 may be omitted, or the electronic device 1000 may include more than three imaging modules.

In the embodiment of the present disclosure, the first imaging module 20 includes a first lens assembly 24, a package housing 25, and a first image sensor 26 and the first lens assembly 24 is housed in the package housing 25.

Figure 5:
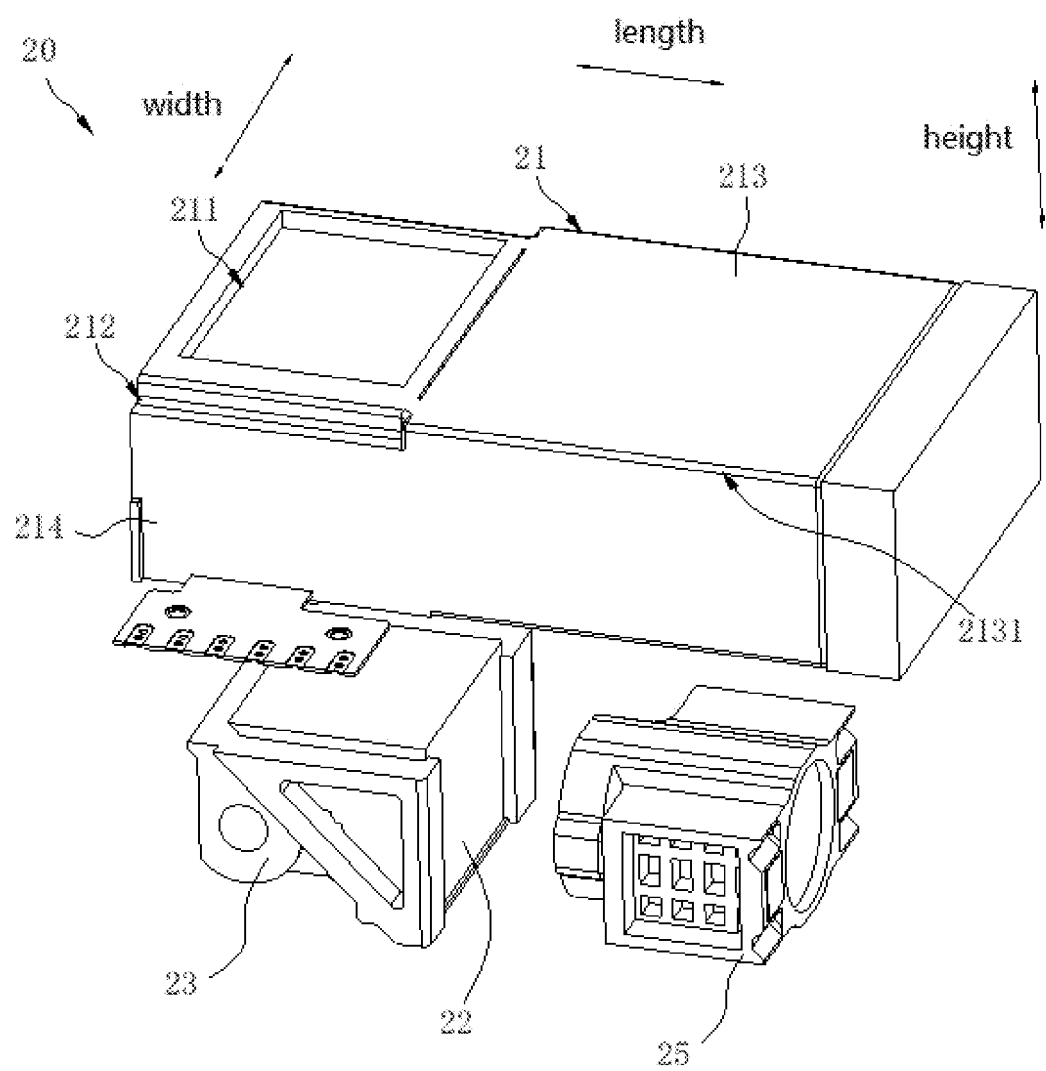
FIG. 5 illustrates an exploded perspective view of a first imaging module according to an embodiment of the present disclosure.
Figure 6:
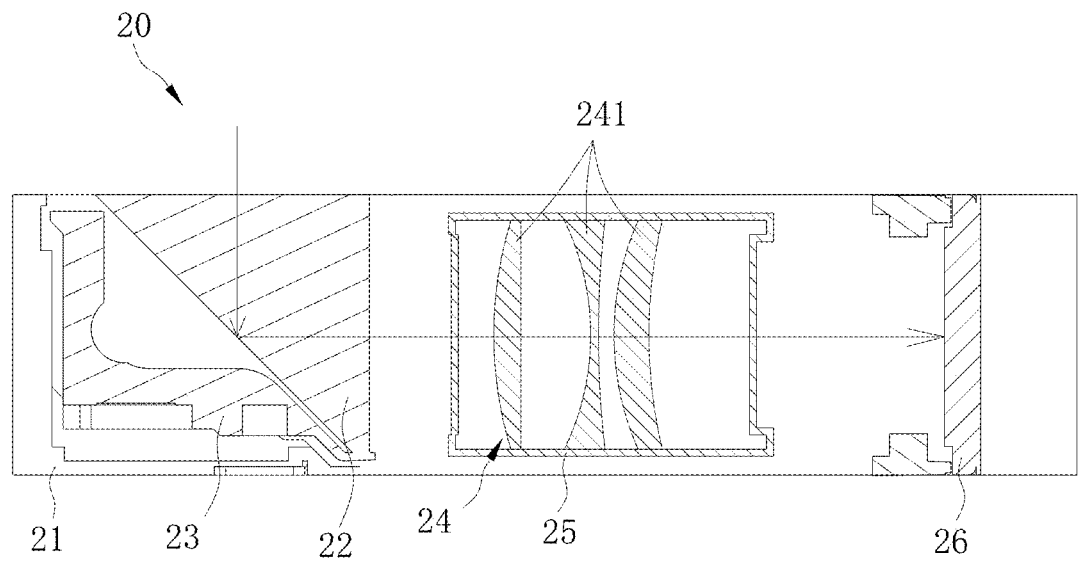
FIG. 6 illustrates a cross-sectional view of a first imaging module according to an embodiment of the present disclosure.

Referring to FIG. 5 and FIG. 6, in the embodiment, the camera assembly 100 further includes a shell 21 and a light-redirecting element 22. The shell 21 defines a light incident opening 211 and a receiving recess 212 adjacent to the light incident opening 211. The first imaging module 20 and the light-redirecting element 22 are accommodated in the shell 21. The axis of the light incident opening 211 is perpendicular to an optical axis of the first imaging module 20.

The light-redirecting element 22 may be disposed on the mounting seat 23. The light-redirecting element 22 is configured to redirect an incident light from the light incident opening 211 to the first imaging module 20. The incident light is redirected by the light-redirecting element 22 and then transmitted through the first lens assembly 24 to the first image sensor 26, thereby the image sensor 26 forms an external image. In the present embodiment, the incident light is redirected by the light-redirecting element 22 along a length direction of the shell 21 to the first lens assembly 24. The receiving recess 212 extends along a direction parallel with the length direction of the shell 21.

The decorative member 10 is mounded on the shell 21 in such a manner that the light incident opening 211 is exposed from the decorative member 10. The decorative member 10 is arranged around the light incident opening 211 and partially received in the receiving recess 212.

In detail, the decorative ring 12 is positioned above the shell 21 such that the light incident opening 211 is exposed from the through hole 11. In the embodiment, the light incident opening 211 is exposed from the first through hole 111. The first through hole 111 may have a different shape from the light incident opening 211 or have the same shape as the light incident opening 211. The flange 13 of the decorative member 10 is received in the receiving recess 212, so that the size of the decorative member 10 is small.

The shell 21 has a substantially cuboid configuration. The light incident opening 211 is defined on a surface perpendicular to an optical incident surface of the first image sensor 26, thus needing the light-redirecting element 22 to steer the incident light to the first image sensor 26. Therefore, the first imaging module 20 may be viewed as a periscope lens module. Compared with a common vertical lens module, in which the light is directly incident to the image sensor without changing the direction of the optical axis, the height of the periscope lens module is smaller, so that the overall thickness of the electronic device 1000 can be reduced.

It can be understood that the light incident opening 211 is exposed through the through hole 11 to allow external light to pass through the through hole 11 and enter the first imaging module 20 from the light incident opening 211.

Figure 9:
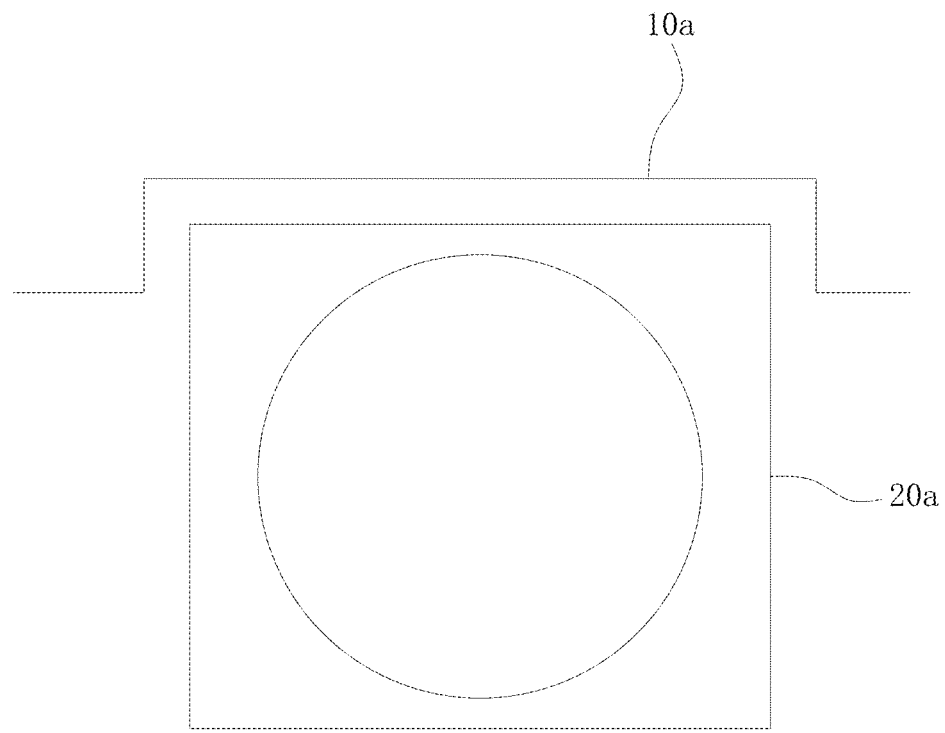
FIG. 9 illustrates a schematic structural view of an imaging module coupled with a decorative member according to some embodiments.

Referring to FIG. 9, if the receiving recess 212 is omitted, in order to reduce the overall thickness of the electronic device, a periscope imaging module 20a partially protrudes into the decorative member 10a in the width direction. Because the width of the periscope imaging module 20a is longer than that of the vertical imaging module, the size of the decorative member 10a is larger, thus the electronic device is not compact enough.

Figure 7:
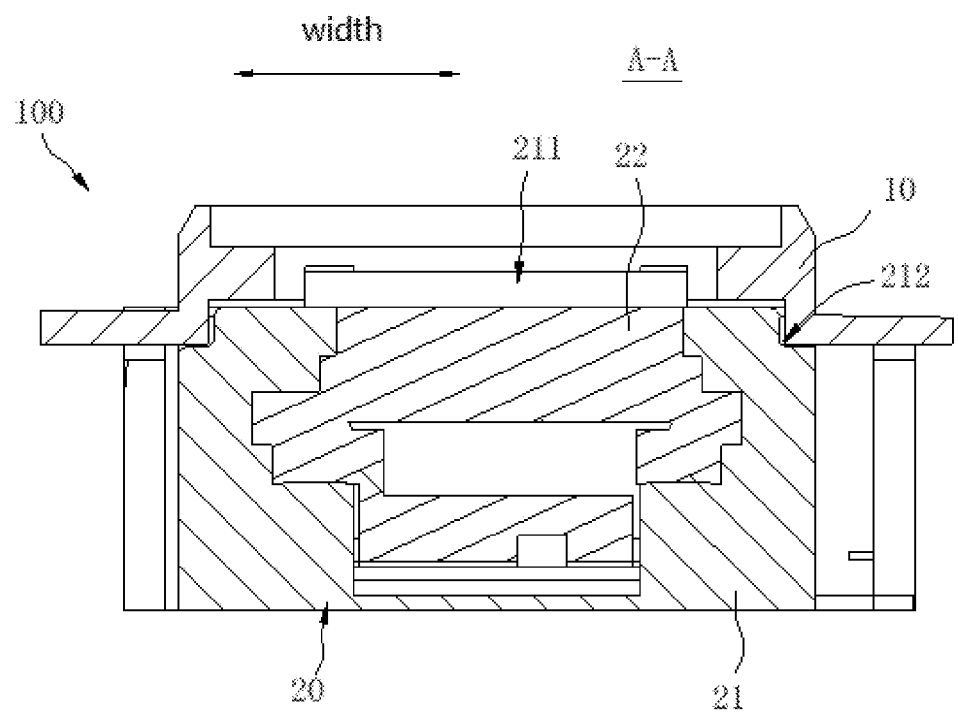
FIG. 7 illustrates a cross-sectional view of the camera assembly of FIG. 2 taken along a line A-A.

Referring to FIG. 5 and FIG. 7 again, in the embodiment, the receiving recess 212 is formed on one side of the light incident opening 211, and the decorative member 10 is disposed above the light incident opening 211 and partially disposed into the recess 212. The width of the decorative member 10 is small, and the overall height of the camera assembly 100 can be reduced. It is advantageous for compactness and miniaturization of the camera assembly 100.

Specifically, the shell 21 includes a top wall 213 and at least a side wall 214. The top wall 213 includes two opposite edges 2131. The sidewall 214 is extending from one edge 2131 of the top wall 213. In the embodiment of the present disclosure, there are two side walls 214 respectively extending from each of the two edges 2131. In another embodiment, there may be only one side wall 214 extending from the edge 2131.

The light incident opening 211 is defined in the top wall 213, and the receiving recess 212 is defined at the junction of the top wall 213 and the side wall 214, and the decorative member 10 abuts against the top wall 213 and the side wall. The receiving recess 212 may be easily formed to facilitate the manufacture of the outer casing 21. In one example, the receiving recess 212 is a profile of the shell 21, that is, the receiving recess 212 can be formed by stamping.

The light incident opening 211 is in a rectangular shape, and there are two receiving recesses 212 defined along two elongated edges 2131. The receiving recesses 212 both are adjacent to the light incident opening 211, specifically, the light incident opening 211 is positioned between the two receiving recesses 212.

In another embodiment of the present disclosure, the light incident opening 211 is in a shape with a curved edge. Thus, the receiving recess may be defined along a part of the curved edge of the light incident opening 211.

In this embodiment, the receiving recess 212 extends along a length direction of the shell 21. As such, the receiving recess 212 aligns with the decorative member 10 to be more compact. In other embodiments, the structure and shape of the receiving recess 212 are not limited to the above examples, as long as the decorative member 10 and the first imaging module 20 form a complementary structure to reduce the size of the decorative member 10.

In one example, a portion of the bottom of the decorative ring 12 is received in the receiving recess 212 and thus, the decorative ring 12 may be partially abutted against the top wall 213. In other words, the decorative ring 12 and the shell 21 form a complementary structure, and the decorative ring 12 and the shell 21 are fitted with each other to make the structure of the decorative member 10 and the shell 21 more compact.

The light-redirecting element 22 is a prism or a mirror. In one example, when the light-redirecting element 22 is a prism, the prism may be a triangular prism, and the prism has a right-angled triangle in cross section, wherein the light is incident from one of the right-angled sides of the right-angled triangle, and is reflected by the oblique side and emitted out from the other of the right-angled sides. It can be understood that, the incident light can be refracted by the prism and emitted without reflection. The prism can be made of a material having good light transmittance, such as glass or plastic. In one embodiment, a reflective material such as silver may be coated on one of the surfaces of the prism to reflect incident light.

It can be understood that when the light-redirecting element 22 may be a plane mirror, the plane mirror reflects the incident light to change the direction of the incident light.

In one example, the light-redirecting element 22 turns the direction of the incident light incident from the light incident opening 211 at an angle of 90 degrees. For example, the incident angle of the incident light on a reflecting surface of the light-redirecting element 22 is 45 degrees, and the reflection angle is also 45 degrees. The light-redirecting element 22 may turn the direction of the incident light to other angles, for example, 80 degrees, 100 degrees, or the like, as long as the incident light can be guided to reach the first image sensor 26.

In the embodiment of the present disclosure, there is just one light-redirecting element 22. The incident light may be transmitted to the first image sensor 26 after being redirect once. In other embodiments, there may be more than one light-redirecting elements 22, thus the incident light may be transmitted to the first image sensor 26 after being turned at least twice.

The camera assembly 100 further includes a mounting seat 23. The mounting seat 23 is used to mount the light-redirecting element 22, or the mounting seat 23 is a carrier of the light-redirecting element 22. The light-redirecting element 22 is fixedly disposed on the mounting seat 23. This allows the position of the light-redirecting element 22 to be fixed to facilitate the reflection or refracting of the incident light. The light-redirecting element 22 may be fixed to the mounting seat 23 by adhesive bonding to achieve a fixed connection with the mounting seat 23.

In one example, the mounting seat 23 may be movably disposed in the housing 21, and the mounting seat 23 is rotatable relative to the housing 21 to adjust the direction of the incident light changed by the light-redirecting element 22, thereby enabling the first imaging module 20 to achieve optical image stabilization. When the first imaging module 20 photographs, if the first imaging module 20 is shaken, the first image sensor 26 may not obtain a stable image, and the formed image quality is poor. The mounting seat 23 may carry the light-redirecting element 22 move together in an opposite direction of the shaking of the first imaging module 20, thereby compensating for the incident deviation of the incident light of the light incident opening 211. An optical anti-shake effect is realized. The mounting seat 23 may be coupled to an electric motor that may drive the mounting seat 23 to rotate.

The first lens assembly 24 is received in the package housing 25. Further, the first lens assembly 24 is disposed between the light-redirecting element 22 and the first image sensor 26. The first lens assembly 24 is used to introduce incident light to the first image sensor 26 for imaging. This allows the first image sensor 26 to obtain an image with better quality.

The first lens assembly 24 may obtain image on the first image sensor 26 as it moves along its optical axis, thereby enabling the first imaging module 20 to focus on the object. The first lens assembly 24 includes several lenses 241. As the at least one lens 241 moves, the overall focal length of the first lens assembly 24 is changed as well, thus the zooming function of the first imaging module 20 is realized.

The first image sensor 26 may be a complementary metal oxide semiconductor (CMOS) photosensitive element or a charge coupled device (CCD).

Figure 8:
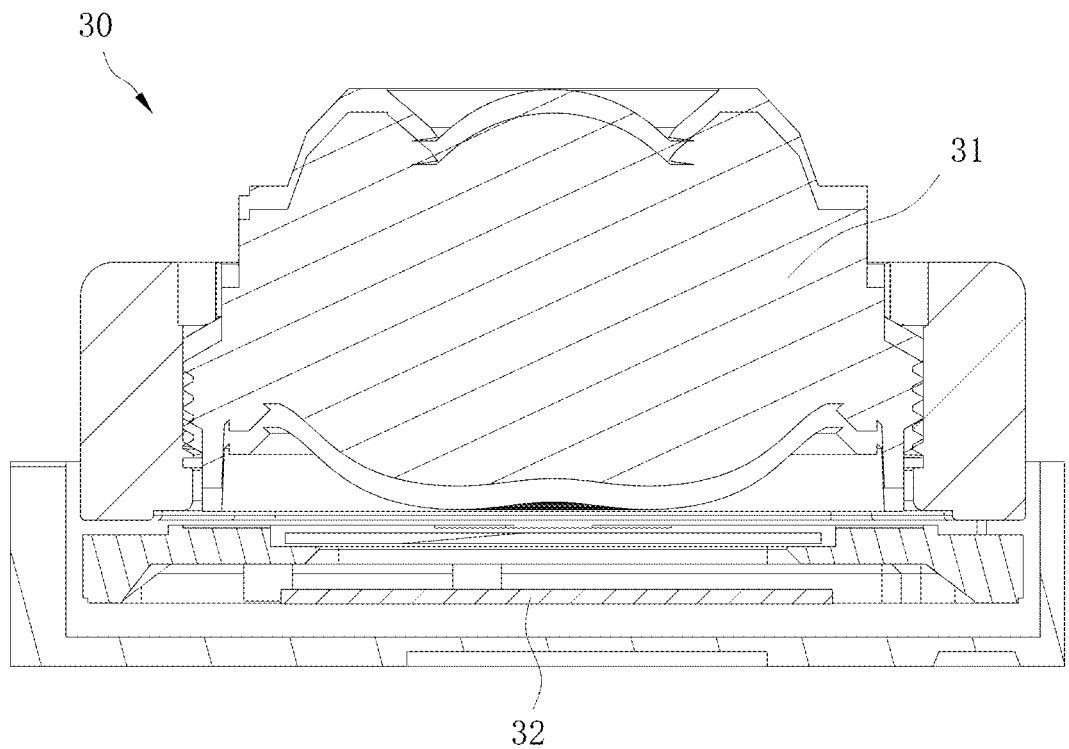
FIG. 8 illustrates a cross-sectional view showing a second imaging module according to an embodiment of the present disclosure.

Referring to FIG. 8, in the embodiment, the second imaging module 30 is a vertical lens module. In other embodiments, the second imaging module 30 may also be a periscope lens module. The second imaging module 30 includes a second lens assembly 31 and a second image sensor 32. The incident light of the second lens assembly 31 is imaged on the second image sensor 32. The optical axis of the second lens assembly 31 coincides with the optical axis of the second image sensor 32.

The second imaging module 30 may have an individual decorative member. In the embodiment of the present embodiment, the second imaging module 30 and the first imaging module 30 share the decorative member 10, and the second imaging module 30 is exposed from the decorative member 10 to capture image.

The second imaging module 30 is exposed by the second through hole 112, and an optical axis of the second imaging module 30 is coincided with a central axis of the second through hole 112. Furthermore, the optical axis of the second imaging module 30 and the optical axis of the first imaging module 20 will intersect inside the second imaging module 30.

In the embodiment, the second imaging module 30 is a fixed-focus lens module. The second lens assembly 31 has fewer lenses 241, so that the second imaging module 30 has a lower height. The lower height is advantageous for reducing the thickness of the electronic device 1000.

The type of the second image sensor 32 may be the same as that of the first image sensor 26, and details are not described herein again.

In summary, the camera assembly 100 of the embodiment of the present disclosure includes the first imaging module 20 and the decorative member 10, and the first imaging module 20 includes the shell 21, the light-redirecting element 22, and the first image sensor 26.

The shell 21 is provided with a light incident opening 211, and the light-redirecting element 22 is disposed in the shell 21. The light-redirecting element 22 is used to redirect the incident light incident from the light incident opening 211 and then transmit it to the first image sensor 26. In the width direction of the first imaging module 20, the shell 21 is formed with a receiving recess 212 on one side of the light incident opening 211, and the decorative member 10 is disposed over the light incident opening 211 and partially engaged into the receiving recess 212.

The camera assembly 100 of the embodiment of the present disclosure can be assembled as follows.

The first imaging module 20 and the decorative member 10 are provided. The first imaging module includes the housing 21, the light-redirecting element 22 and the first image sensor 26. The housing 21 is provided with the light incident opening 211, and the light-redirecting element 22 is disposed inside the shell 21. The light-redirecting element 22 is used to redirect the incident light incident from the light incident opening 211 to the first image sensor 26. In the width direction of the first imaging module 20, the shell 21 is provided with receiving recess 212 at the side of the light incident opening 211. The decorative member 10 is formed with the through hole 11.

The decorative member 10 is placed over the light incident opening 211 and the decorative member 10 is partially clasped in the receiving recess 212, and the light incident opening 211 is exposed from the through hole 11.

In the camera assembly 100 and the electronic device 1000, the receiving recess 212 is formed on one side of the light incident opening 211, and the decorative member 10 is disposed on the light incident opening 211 and partially engaged in the receiving recess 212, as such, not only the decorative member 10 has smaller width dimension, but also the overall height dimension of the camera assembly 100 is reduced. Thus, a compact and a miniaturized camera assembly 100 is obtained.

While the disclosure has been described in terms of what is presently considered to be the most practical and preferred embodiments, it is to be understood that the disclosure need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A camera assembly, comprising:
a shell, wherein the shell comprises a top wall and a side wall extending from an edge of the top wall;
a light incident opening, wherein the light incident opening is defined in the top wall;
a first imaging module, accommodated in the shell;
a light-redirecting element, accommodated in the shell and configured to redirect an incident light from the light incident opening to the first imaging module;
a receiving recess, defined in the shell and adjacent to the light incident opening, wherein the receiving recess is defined at a junction of the top wall and the side wall; and
a decorative member, mounted on the shell in such a manner that the light incident opening is exposed from the decorative member and the decorative member is arranged around the light incident opening, wherein the decorative member comprises a decorative ring and a flange, the decorative ring comprises an interior part and an annular part, the interior part defines a first through hole aligned with the light incident opening, the annular part surrounds the interior part and extends upwardly from the interior part, the flange extends from a bottom of the decorative ring outwardly away from the interior part and beyond the side wall, the flange is partially received in the receiving recess and abuts against the side wall, a portion of the bottom of the decorative ring is received in the receiving recess and partially abuts against the top wall, and the decorative ring is disposed around the light incident opening.

2. The camera assembly of claim 1, wherein the light incident opening is in a rectangular shape.

3. The camera assembly of claim 1, further comprising another receiving recess, wherein the shell comprises a top wall and two side walls extending from corresponding edges of the top wall, each receiving recess is defined at each junction of each side wall and the top wall, and the light incident opening is positioned between the two receiving recesses.

4. The camera assembly of claim 1, wherein the first imaging module comprises a first lens module and a first image sensor, the first lens module is disposed between the light-redirecting element and the first image sensor, and the first lens module is configured to image the incident light to the first image sensor.

5. The camera assembly of claim 4, wherein the first imaging module comprises a package housing received in the shell, the first lens module is moveably received in the package housing to adjust a focal length of the first lens module.

6. The camera assembly of claim 1, wherein an axis of the light incident opening is perpendicular to an optical axis of the first imaging module.

7. The camera assembly of claim 1, wherein the incident light incident to the light-redirecting member is redirected to the first imaging module along an optical axis of the first imaging module.

8. The camera assembly of claim 1, wherein the incident light incident to the light-redirecting member is redirected to the first imaging module along a length direction of the shell, and the receiving recess extends along a direction parallel with the length direction of the shell.

9. The camera assembly of claim 1, further comprising a mounting seat received in the shell, wherein the light-redirecting element is fixed on the mounting seat.

10. The camera assembly of claim 9, wherein the mounting seat is rotatable relative to the shell to adjust a direction of the incident light redirected by the light-redirecting element, thereby enabling the first imaging module to achieve optical image stabilization.

11. The camera assembly of claim 1, further comprising a second imaging module, wherein the second imaging module is disposed adjacent to the first imaging module, the decorative member defines at least a through hole to expose the first imaging module and the second imaging module.

12. The camera assembly of claim 11, wherein the decorative member defines a first through hole aligned with the light incident opening and a second through hole corresponding to the second imaging module, the second imaging module comprises a second lens module and a second image sensor, and an optical axis of the second lens module is coincided with a central axis of the second through hole.

13. The camera assembly of claim 11, wherein the first imaging module and the second imaging module are arranged along a straight line.

14. The camera assembly of claim 1, wherein the decorative member is an integrated molding structure formed by the decorative ring and the flange.

15. The camera assembly of claim 1, wherein the decorative ring and the flange are separated structures.

16. A camera assembly, comprising:
a shell, wherein a light inlet, a receiving recess adjacent to the light inlet, a first cavity communicated with the light inlet and a second cavity communicated with the first cavity are defined in the shell the shell comprises a top wall and a side wall extending from an edge of the top wall;
a camera module, positioned in the second cavity;
a light-redirecting element, positioned in the first cavity, wherein the light-redirecting element corresponds to the light inlet and configured to redirect an incident light from the light inlet to the camera module; and
a decorative member, mounted on the shell, wherein the decorative member defines a through hole to expose the light inlet the decorative member comprises a decorative ring and a flange, the decorative ring comprises an interior part and an annular part, the through hole is defined in the interior part, the annular part surrounds the interior part and extends upwardly from the interior part, the flange extends from a bottom of the decorative ring outwardly away from the interior part and beyond the side wall, the decorative ring is received in the receiving recess and partially abuts against the top wall, the flange is partially received in the receiving recess and abuts against the side wall.

17. The camera assembly of claim 16, wherein the light inlet is coaxial with the though hole, and a central axis of the light inlet is perpendicular to an optical axis of the image module.

18. The camera assembly of claim 16, further comprising a bracket, wherein the camera module is disposed in the bracket and fixed to the bracket.

19. An electronic device, comprising:
a casing; and
a camera assembly, accommodated in the casing, the camera assembly comprising:

a shell, wherein the shell comprises a top wall and a side wall extending from an edge of the top wall;

a light incident opening, wherein the light incident opening is defined in the top wall;

an imaging module, accommodated inside the shell;

a light-redirecting element, accommodated inside the shell and configured to redirect an incident light from the light incident opening to the imaging module;

a receiving recess, defined at the shell and adjacent to the light incident opening, wherein the receiving recess is defined at a junction of the top wall and the side wall; and a decorative member, mounted on the shell, the decorative member defining a through hole aligned with the light incident opening to expose the light incident opening, the decorative member being partially received in the receiving recess, wherein the decorative member comprises a decorative ring and a flange, the decorative ring comprises an interior part and an annular part, the interior part defines a first through hole aligned with the light incident opening, the annular part surrounds the interior part and extends upwardly from the interior part, the flange extends from a bottom of the decorative ring outwardly away from the interior part and beyond the side wall, the flange is partially received in the receiving recess and abuts against the side wall, a portion of the bottom of the decorative ring is received in the receiving recess and partially abuts against the top wall, and the decorative ring is disposed around the light incident opening.

20. The electronic device of claim 19, wherein the decorative member is engaged with the casing by an interference fit.

* * * * *